(12) United States Patent
Zhou et al.

(10) Patent No.: US 8,369,819 B2
(45) Date of Patent: Feb. 5, 2013

(54) DOUBLE FREQUENCY-CONVERSION RECEIVING CIRCUIT AND METHOD USED FOR RADIO-FREQUENCY SIM CARD

(75) Inventors: Jianbo Zhou, Shenzhen (CN); Qian Zhao, Shenzhen (CN)

(73) Assignee: Nationz Technologies Incorporated, Shenzhen (CN)

( * ) Notice: Subject to any disclaimer, the term of this patent is extended or adjusted under 35 U.S.C. 154(b) by 139 days.

(21) Appl. No.: 13/120,362

(22) PCT Filed: Sep. 21, 2009

(86) PCT No.: PCT/CN2009/074068
§ 371 (c)(1),
(2), (4) Date: Mar. 22, 2011

(87) PCT Pub. No.: WO2010/037322
PCT Pub. Date: Apr. 8, 2010

(65) Prior Publication Data
US 2011/0170641 A1   Jul. 14, 2011

(30) Foreign Application Priority Data
Sep. 23, 2008   (CN) .......................... 2008 1 0216332

(51) Int. Cl.
*H04B 1/26* (2006.01)
(52) U.S. Cl. ......... 455/313; 455/209; 455/314; 455/315
(58) Field of Classification Search .............. 455/313, 455/209, 314, 315, 316–318, 341, 323, 326, 455/334, 130, 208, 230
See application file for complete search history.

(56) References Cited

U.S. PATENT DOCUMENTS

| | | | |
|---|---|---|---|
| 5,390,346 A * | 2/1995 | Marz | 455/260 |
| 5,697,089 A * | 12/1997 | Lundqvist et al. | 455/315 |
| 5,758,276 A * | 5/1998 | Shirakawa et al. | 455/314 |
| 5,774,194 A * | 6/1998 | Armbruster | 348/726 |
| 5,930,696 A * | 7/1999 | Tzuang et al. | 455/311 |
| 6,271,603 B1 * | 8/2001 | Kajita | 307/43 |
| 6,298,227 B1 * | 10/2001 | Molnar | 455/323 |
| 6,567,654 B1 * | 5/2003 | Coronel Arredondo et al. | 455/315 |
| 6,735,421 B1 * | 5/2004 | Claxton et al. | 455/207 |
| 6,741,847 B1 * | 5/2004 | Claxton et al. | 455/306 |
| 6,768,902 B1 * | 7/2004 | Kajita | 455/313 |
| 7,509,104 B2 * | 3/2009 | Song | 455/190.1 |
| 2007/0149160 A1 * | 6/2007 | Tseng et al. | 455/314 |

* cited by examiner

*Primary Examiner* — Pablo Tran
(74) *Attorney, Agent, or Firm* — Finnegan, Henderson, Farabow, Garrett & Dunner, L.L.P.

(57) ABSTRACT

A double frequency-conversion receiving circuit used for a radio-frequency SIM card, including a low-noise amplifier (01), a high-medium-frequency mixer (02), a low-medium-frequency mixer (03), a local oscillator (04), a quadrature I/Q circuit (05), and a low-medium-frequency processing circuit (07), characterized in that it also includes a frequency divider (06) that performs N frequency dividing to a high-local-oscillation signal generated by the local oscillator (04), wherein the divided low-local-oscillation signal is inputted into the quadrature I/Q circuit (05), the outputted I/Q local-oscillation signal is inputted into the low-medium-frequency mixer (03) to obtain, after mixing, a low-medium-frequency signal, and the low-medium-frequency signal is further processed by the low-medium-frequency processing circuit (07) to output the signal needed, which has gone through the double frequency-conversion. The scheme described in this invention can improve the signal image frequency to approximately 3 GHz through smart frequency distribution without using an external image rejection filter. This effectively solves the image rejection problem when the radio-frequency SIM card is used in the 2.4 GHz ISM frequency band, and reduces power consumption of the chip.

9 Claims, 1 Drawing Sheet

DOUBLE FREQUENCY-CONVERSION RECEIVING CIRCUIT AND METHOD USED FOR RADIO-FREQUENCY SIM CARD

CROSS-REFERENCE TO RELATED APPLICATION

This application is a national stage entry of PCT/CN2009/074068 filed Sep. 21, 2009, which is based upon and claims the benefit of priority from Chinese Application No. 200810216332.8 filed Sep. 23, 2008, the entire contents of which are incorporated herein by reference.

TECHNICAL FIELD

This invention relates to a record carrier which is used along with a machine. It specially relates to a record carrier with semiconductor circuit elements and especially a double frequency-conversion circuit and method used for a radio-frequency SIM card.

BACKGROUND

The radio-frequency wireless transceiver chip of the existing technology includes three implementation schemes, i.e., superheterodyne (double frequency-conversion), low-medium-frequency (single frequency-conversion), and zero-medium-frequency. Based on double frequency-conversion that works in the frequency band of 2.4 GH ISM, this invention proposes a smart frequency distribution scheme that is flexibly and successfully used in the radio-frequency SIM card of a radio-frequency handheld terminal.

As compared with the scheme adopted by the existing technology in the frequency band of 2.4 GHz ISM, this invention has the following advantages: it improves the signal image frequency to approximately 3 GHz through smart frequency distribution without using an external image rejection filter. As the frequency band of 3 GHz is rarely used, this effectively solves the image rejection problem in the application of 2.4 GHz ISM frequency band. It is used successfully in a radio-frequency SIM card.

The existing technology for frequency conversion has the following disadvantages: when a radio-frequency SIM card is used in the 2.4 GHz ISM frequency band, an external filter is needed to solve the image rejection problem in the actual application, and power consumption of the chip is relatively high.

CONTENTS OF THE INVENTION

The technical problem to be solved by this invention is to avoid the disadvantages of the existing technology and to propose a double frequency-conversion circuit and method used in a radio-frequency SIM card.

This invention provides a double frequency-conversion receiving circuit used for a radio-frequency SIM card, including a low-noise amplifier, a high-medium-frequency mixer, a low-medium-frequency mixer, a local oscillator, a quadrature I/Q circuit, and a low-medium-frequency processing circuit. It also includes a frequency divider which performs N frequency dividing to a high-local-oscillation signal generated by the local oscillator to obtain a low-local-oscillation signal, N being a positive integer, 5<N<12, wherein the divided low-local-oscillation signal is inputted into the quadrature I/Q circuit to obtain a low I/Q local-oscillation signal, the I/Q local-oscillation signal outputted from quadrature I/Q circuit and a high-medium-frequency signal outputted from the high-medium-frequency mixer are inputted into the low-medium-frequency mixer for mixing, to obtain a low-medium-frequency signal, and the low-medium-frequency signal is processed by the low-medium-frequency processing circuit to output the signal needed, which has gone through the double frequency-conversion.

This invention can also solve the technical problem through the following technical scheme: it provides a double frequency-conversion method used in the radio-frequency SIM card, based on the double frequency-conversion circuit used for the radio-frequency SIM card. The frequency-conversion method includes the following steps:

A. the local oscillator generates a high-local-oscillation signal $LO_H$ with a frequency $f_{LO,highIF}$, which is inputted into the high-medium-frequency mixer and the frequency divider;

B. the frequency divider performs N frequency dividing to the high-local-oscillation signal $LO_H$ to obtain a low-local-oscillation signal $LO_L$ with a frequency $f_{LO,lowIF}$, which is inputted into the quadrature I/Q circuit;

C. the quadrature I/Q circuit processes the inputted low-local-oscillation signal $LO_L$ to generate a quadrature I/Q local-oscillation signal, which is inputted into the low-medium-frequency mixer;

D. an antenna signal $f_{rf}$ received from the antenna is inputted into the low-noise amplifier;

E. the antenna signal $f_{rf}$ after being amplified by the low-noise amplifier, is outputted to the high-medium-frequency mixer for mixing, to obtain a high-medium-frequency signal $IF_H$ with a frequency $f_{IF,high}$;

F. the high-medium-frequency signal $IF_H$ and the quadrature I/Q local-oscillation signal are inputted into the low-medium-frequency mixer for mixing, to obtain a low-medium-frequency signal $IF_L$ with a frequency $f_{IF,low}$; G. the low-medium-frequency signal $IF_L$, after being processed by the low-medium-frequency processing circuit, is outputted as the signal needed, which has gone through the double frequency-conversion.

The frequency $f_{LO,highIF}$ of the high-local-oscillation signal $LO_H$ satisfies:

$f_{LO,highIF} = [N/(N-1)]*(f_{rf}+f_{IF,low})$, wherein N is an integer larger than 5 and smaller than 12.

The radio-frequency SIM card includes a radio-frequency wireless transceiver chip, an interface treatment circuit, and a main control integrated circuit. The radio-frequency SIM card can, via the radio-frequency wireless transceiver chip, communicate with a supporting peripheral unit within a certain distance.

The radio-frequency wireless transceiver chip works in the frequency band of 2.4 GHz ISM.

As compared with the existing technology, this invention has the following beneficial effects: it can improve the signal image frequency to approximately 3 GHz through smart frequency distribution without using an external image rejection filter. This effectively solves the image rejection problem when using the radio-frequency SIM card in the 2.4 GHz ISM frequency band, and reduces power consumption of the chip.

DESCRIPTION OF THE EMBODIMENTS

Reference will now be made in detail to exemplary embodiments, examples of which are illustrated in the accompanying drawings.

Figure 1:
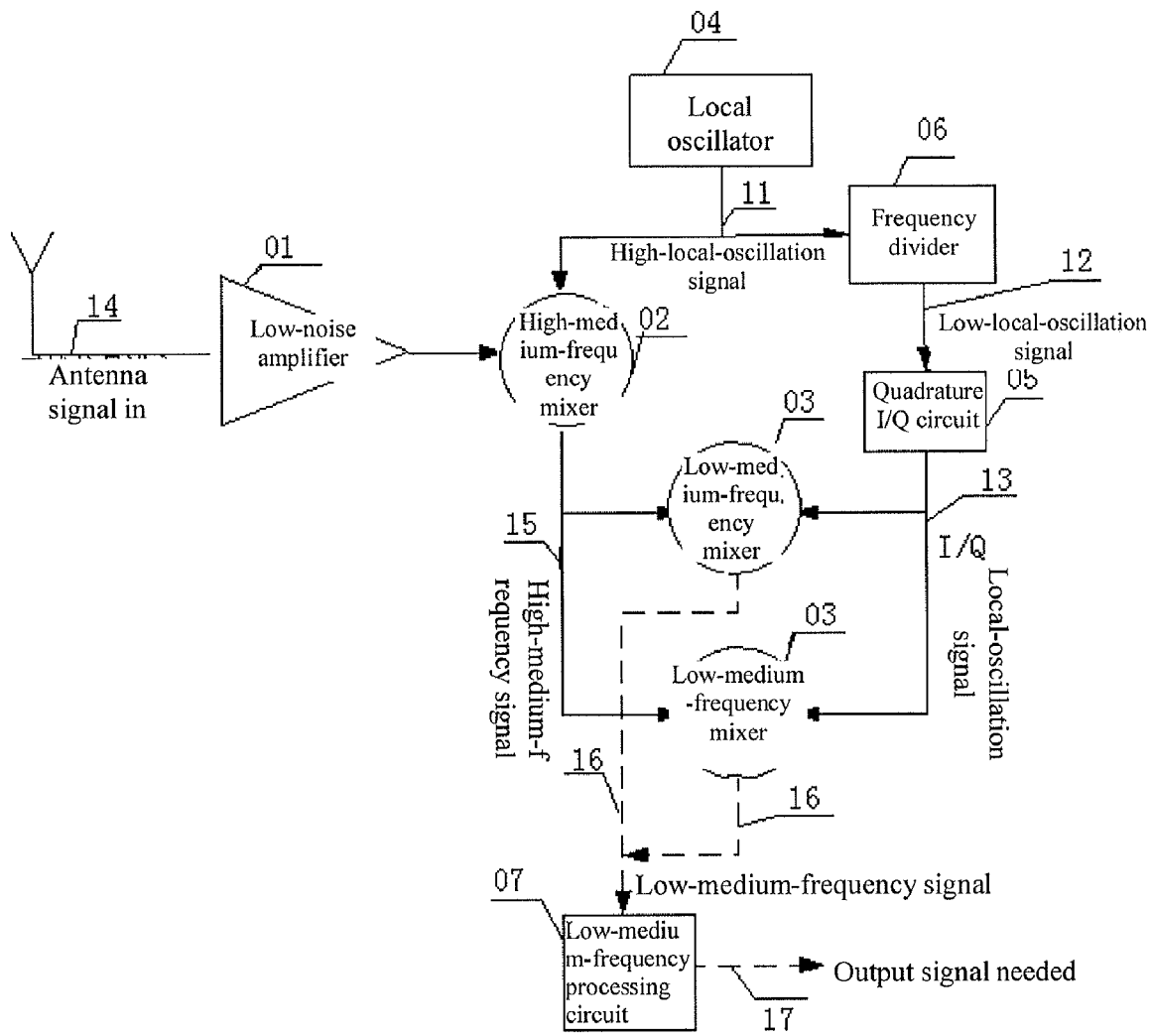
FIG. 1 is a logic block diagram of the circuit of this invention.

This invention, a double frequency-conversion receiving circuit used for a radio-frequency SIM card as shown in FIG. 1, includes a low-noise amplifier 01, a high-medium-frequency mixer 02, a low-medium-frequency mixer 03, a local oscillator 04, a quadrature I/Q circuit 05, and a low-medium-frequency processing circuit 07. It also includes a frequency divider 06 that performs N frequency dividing to a high-local-oscillation signal generated by the local oscillator 04 to obtain a low-local-oscillation signal, N being a positive integer, 5<N<12, wherein the divided low-local-oscillation signal is inputted into the quadrature I/Q circuit 05, to obtain an I/Q local-oscillation signal, the I/Q local-oscillation signal outputted from quadrature I/Q circuit 05 and a high-medium-frequency signal outputted from the high-medium-frequency mixer 02 are inputted into the low-medium-frequency mixer 03 for mixing, to obtain a low-medium-frequency signal, and the low-medium-frequency signal is processed by the low-medium-frequency processing circuit 07 to output the signal needed, which has gone through the double frequency-conversion.

This invention can solve the technical problem through the following technical scheme: a double frequency-conversion method used in the radio-frequency SIM card, based on the double frequency-conversion circuit used in the radio-frequency SIM card as shown in FIG. 1. Specially, the method includes the steps as shown in FIG. 1:

A. in Step 11, the local oscillator 04 generates a high-local-oscillation signal $LO_H$ with a frequency $f_{LO,highIF}$, which is inputted into the high-medium-frequency mixer 02 and the frequency divider 06;

B. in Step 12, the frequency divider 06 performs N frequency dividing to the high-local-oscillation signal $LO_H$ to obtain a low-local-oscillation signal $LO_L$ with a frequency $f_{LO,lowIF}$, which is inputted into the quadrature I/Q circuit 05;

C. in Step 13, the quadrature I/Q circuit 05 processes the inputted low-local-oscillation signal $LO_L$ to generate a quadrature I/Q local-oscillation signal, which is inputted into the low-medium-frequency mixer 03;

D. in Step 14, an antenna signal $f_{rf}$ received from the antenna is inputted into the low-noise amplifier 01;

E. in Step 15, the antenna signal $f_{rf}$, after being amplified by the low-noise amplifier 01, is outputted to the high-medium-frequency mixer 02 for mixing, to obtain a high-medium-frequency signal $IF_H$ with a frequency $f_{IF,high}$;

F. in Step 16, the high-medium-frequency signal $IF_H$ and the quadrature I/Q local-oscillation signal are both inputted into the low-medium-frequency mixer 03 to obtain a low-medium-frequency signal $IF_L$ with a frequency $f_{IF,low}$;

G. in Step 17, the low-medium-frequency signal $IF_L$, after being processed by the low-medium-frequency processing circuit 07, is outputted to obtain the signal needed, which has gone through the double frequency-conversion.

The frequency $f_{LO,highIF}$ of the high-local-oscillation signal $LO_H$ satisfies:

$f_{LO,highIF} = [N/(N-1)]*(f_{rf}+f_{IF,low})$, wherein N is an integer larger than 5 and smaller than 12.

The realization method of this invention is described as follows, taking an embodiment as an example:

Supposing the frequency of the antenna signal $f_{rf}$ is 2400 MHz, the frequency of the low-medium-frequency output signal is 2 MHz, and the frequency of the high-local-oscillation signal is 8 times that of the low-local-oscillation signal, i.e., N=8, according to the formula described above, the frequency of the high-local-oscillation signal is:

$$f_{LO,highIF} = \frac{8}{7}(f_{rf} + 2 \text{ MHz}) = 2745.143 \text{ MHz}$$

The frequency of the high-medium-frequency signal $IF_H$ is:

$$f_{IF,high} = f_{LO,highIF} - f_{rf} = \frac{1}{7}f_{rf} + \frac{16}{7} \text{ MHz} = 345.143 \text{ MHz}$$

The high image signal is located at:

$f_{image,high} = f_{LO,highIF} + f_{IF,high} = 2745.143 + 345.143 = 3090.286$ MHz As the interference in the frequency band near 3 GHz is very limited, it is not necessary to use an external image rejection filter when the radio-frequency SIM card works at 2.4 GHz.

The frequency of the local-oscillation signal in the low-medium-frequency mixer is ⅛ that of the high-medium-frequency local-oscillation signal, i.e.:

$f_{LO,lowIF} = f_{LO,highIF}/8 = 343.143$ MHz

To check results, the frequency of the low-medium-frequency output signal is:

$f_{IF,low} = |f_{LO,lowIF} - f_{IF,high}| = 2$ MHz, which is completely correct.

In the low-medium-frequency mixer, when the medium frequency is 2 MHz, the image frequency of its 345.143 MHz high-medium-frequency is 347.143 MHz. It can be rejected with the structure of a traditional image rejection mixer. As the frequency has dropped from 2.4 GHz to 347.143 MHz, it is much easier to treat it with a traditional technical scheme than at the 2.4 GHz high frequency.

Figure 2:
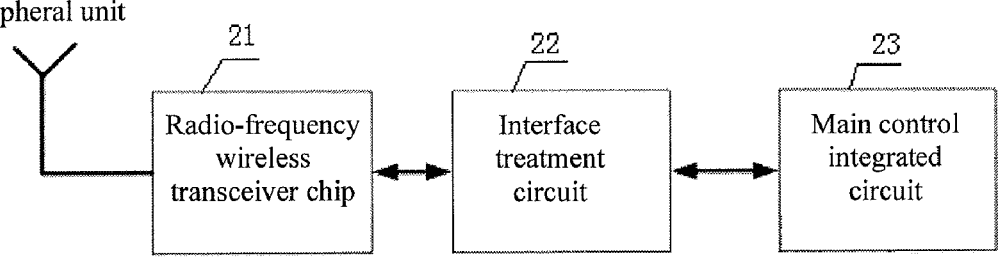
FIG. 2 is a composition diagram of the radio-frequency SIM card described in this invention.

As shown in FIG. 2, the radio-frequency SIM card includes a radio-frequency wireless transceiver chip 21, an interface treatment circuit 22, and a main control integrated circuit 23. This radio-frequency SIM card can, via the radio-frequency wireless transceiver chip 21, communicate with a supporting peripheral unit within a certain distance.

The radio-frequency wireless transceiver chip 21 works in the frequency band of 2.4 GHz ISM.

The above realization process is the preferred realization process of this invention. Any normal change and replacement made by those of ordinary skill in the art on the basis of this invention are covered in the protection scope of this invention.

The invention claimed is:

1. A double frequency-conversion receiving circuit for use in a radio-frequency SIM card, the circuit comprising:
   a low noise amplifier to amplify an antenna signal;
   a local oscillator to generate a high-local-oscillation signal;
   a high-medium-frequency mixer, coupled to the low noise amplifier and the local oscillator, to generate a high-medium-frequency signal based on the amplified antenna signal and the high-local-oscillation signal;
   a frequency divider, coupled to the local oscillator, to perform N frequency dividing to the high-local-oscillation signal generated by the local oscillator, to generate a low-local-oscillation signal, N being a positive integer;
   a quadrature I/Q circuit, coupled to the frequency divider, to generate a low I/Q local-oscillation signal based on the low-local-oscillation signal;
   a low-medium-frequency mixer coupled to the high-medium-frequency mixer and the quadrature I/Q circuit, to generate a low-medium-frequency signal based on the high-medium-frequency signal and the low I/Q local-oscillation signal; and a low-medium-frequency processing circuit, coupled to the low-medium-frequency mixer, to generate an output signal based on the low-medium-frequency signal.

2. The double frequency-conversion receiving circuit according to claim 1, wherein N is larger than 5 and smaller than 12.

3. The double frequency-conversion receiving circuit according to claim 2, wherein the antenna signal has a frequency $f_{rf}$, the low-medium-frequency signal has a frequency $f_{IF,low}$, and the high-local-oscillation signal has a frequency $f_{LO,highIF}$, the frequency $f_{LO,highIF}$ satisfying $f_{LO,highIF}=[N/(N-1)]*(f_{rf}+f_{IF,low})$.

4. The double frequency-conversion receiving circuit according to claim 1, wherein:
the radio-frequency SIM card includes a radio-frequency wireless transceiver chip, an interface treatment circuit, and a main control integrated circuit, and
the radio-frequency SIM card is configured to, via the radio-frequency wireless transceiver chip, communicate with a supporting peripheral unit within a certain distance.

5. The double frequency-conversion receiving circuit according to claim 4, wherein the radio-frequency wireless transceiver chip operates in the frequency band of 2.4 GHz ISM.

6. A double frequency-conversion method used for use in a radio-frequency SIM card, the method comprising:
amplifying, a low-noise amplifier, an antenna signal with a frequency $f_{rf}$;
generating, by a local oscillator, a high-local-oscillation signal $LO_H$ with a frequency $f_{LO,highIF}$;
generating, by a high-medium-frequency mixer, a high-medium-frequency signal $IF_H$ with a frequency $f_{IF,high}$ based on the amplified antenna signal $f_{rf}$ and the high-local-oscillation signal $LO_H$;
performing, by a frequency divider, N frequency dividing to the high-local-oscillation signal $LO_H$ to generate a low-local-oscillation signal $LO_L$ with a frequency $f_{LO,lowIF}$;
generating, by a quadrature I/Q circuit, a quadrature I/Q local-oscillation signal based on the low-local-oscillation signal $LO_L$;
generating, by a low-medium-frequency mixer, a low-medium-frequency signal $IF_L$ with a frequency $f_{IF,low}$ based on the his h-medium-frequency signal $IF_H$ and the quadrature I/Q local-oscillation signal; and
generating, by a low-medium-frequency processing circuit, an output signal after processing the low-medium-frequency signal $IF_L$.

7. The double frequency-conversion method according to claim 6, wherein
the frequency $f_{LO,highIF}$ of the high-local-oscillation signal $LO_H$ satisfies
$f_{LO,highIF}=[(N/(N-1)]*(f_{rf}+f_{IF,low})$, wherein N is an integer larger than 5 and smaller than 12.

8. The double frequency-conversion method according to claim 6, wherein:
the radio-frequency SIM card includes a radio-frequency wireless transceiver chip, an interface treatment circuit, and a main control integrated circuit, and
the radio-frequency SIM card is configured to, via the radio-frequency wireless transceiver chip, communicate with a supporting peripheral unit within a certain distance.

9. The double frequency-conversion method according to claim 8, wherein the radio-frequency wireless transceiver chip operates in the frequency band of 2.4 GHz ISM.

* * * * *